United States Patent
Jones et al.

(10) Patent No.: US 12,307,497 B2
(45) Date of Patent: May 20, 2025

(54) SYSTEMS AND METHODS FOR AUTOMATIC FITTING AND PRODUCT RECOMMENDATIONS USING MACHINE LEARNING

(71) Applicant: Sizelytics, LLC., Eagle Mountain, UT (US)

(72) Inventors: Mark Alan Jones, Eagle Mountain, UT (US); Courtney Killpack, Layton, UT (US)

(73) Assignee: Sizelytics, LLC., Eagle Mountain, UT (US)

( * ) Notice: Subject to any disclaimer, the term of this patent is extended or adjusted under 35 U.S.C. 154(b) by 292 days.

(21) Appl. No.: 17/746,072

(22) Filed: May 17, 2022

(65) Prior Publication Data

US 2022/0366475 A1 Nov. 17, 2022

Related U.S. Application Data

(60) Provisional application No. 63/189,500, filed on May 17, 2021.

(51) Int. Cl.
*G06Q 30/00* (2023.01)
*G06Q 30/0601* (2023.01)

(52) U.S. Cl.
CPC .............. *G06Q 30/0631* (2013.01)

(58) Field of Classification Search
CPC .............................. G06Q 30/06–08
See application file for complete search history.

(56) References Cited

U.S. PATENT DOCUMENTS

| | | | |
|---|---|---|---|
| 10,922,616 B1* | 2/2021 | Liu | G06Q 30/0601 |
| 2011/0218876 A1* | 9/2011 | Sorrentino | A41H 1/00 705/26.7 |
| 2014/0067596 A1 | 3/2014 | McGovern et al. | |

(Continued)

FOREIGN PATENT DOCUMENTS

EP 3745352 A1 12/2020

OTHER PUBLICATIONS

Deacle, Scott, "To Sell Clothes over the Internet, You Need to Know About Computers and ... ", Pittsburgh Post-Gazette, Apr. 29, 2001: N-1 (Year: 2001).*

(Continued)

*Primary Examiner* — Ethan D Civan
(74) *Attorney, Agent, or Firm* — Polsinelli PC; Babak Monajemi; Ryan Murphy

(57) ABSTRACT

One or more aspects of the present disclosure are directed to systems and methods for a mobile-based and a web-based fit and product recommendation and discovery. In one aspect, a method includes receiving a plurality of parameters, via a graphical user-interface, the plurality of parameters providing individual-specific measurements pertaining to an article; performing a plurality of numerical analyses using the plurality of parameters; and determining at least one fit recommendation for the user based on the plurality of numerical analyses; determining one or more product recommendations for the user based on the at least one fit recommendation; and outputting the at least one fit recommendation and the one or more product recommendations to the graphical user-interface.

20 Claims, 10 Drawing Sheets

(56) References Cited

U.S. PATENT DOCUMENTS

| | | | |
|---|---|---|---|
| 2015/0161707 A1* | 6/2015 | Wilkinson | G06Q 30/0631 |
| | | | 705/26.7 |
| 2017/0039622 A1* | 2/2017 | Chen | G06Q 30/0201 |
| 2019/0122424 A1 | 4/2019 | Moore et al. | |
| 2021/0049811 A1* | 2/2021 | Fedyukov | G06T 7/60 |
| 2021/0233148 A1* | 7/2021 | Govindan | G06N 20/00 |

OTHER PUBLICATIONS

International Search Report and Written Opinion issued on Oct. 6, 2022 for corresponding PCT Application No. PCT/US2022/029570.

* cited by examiner

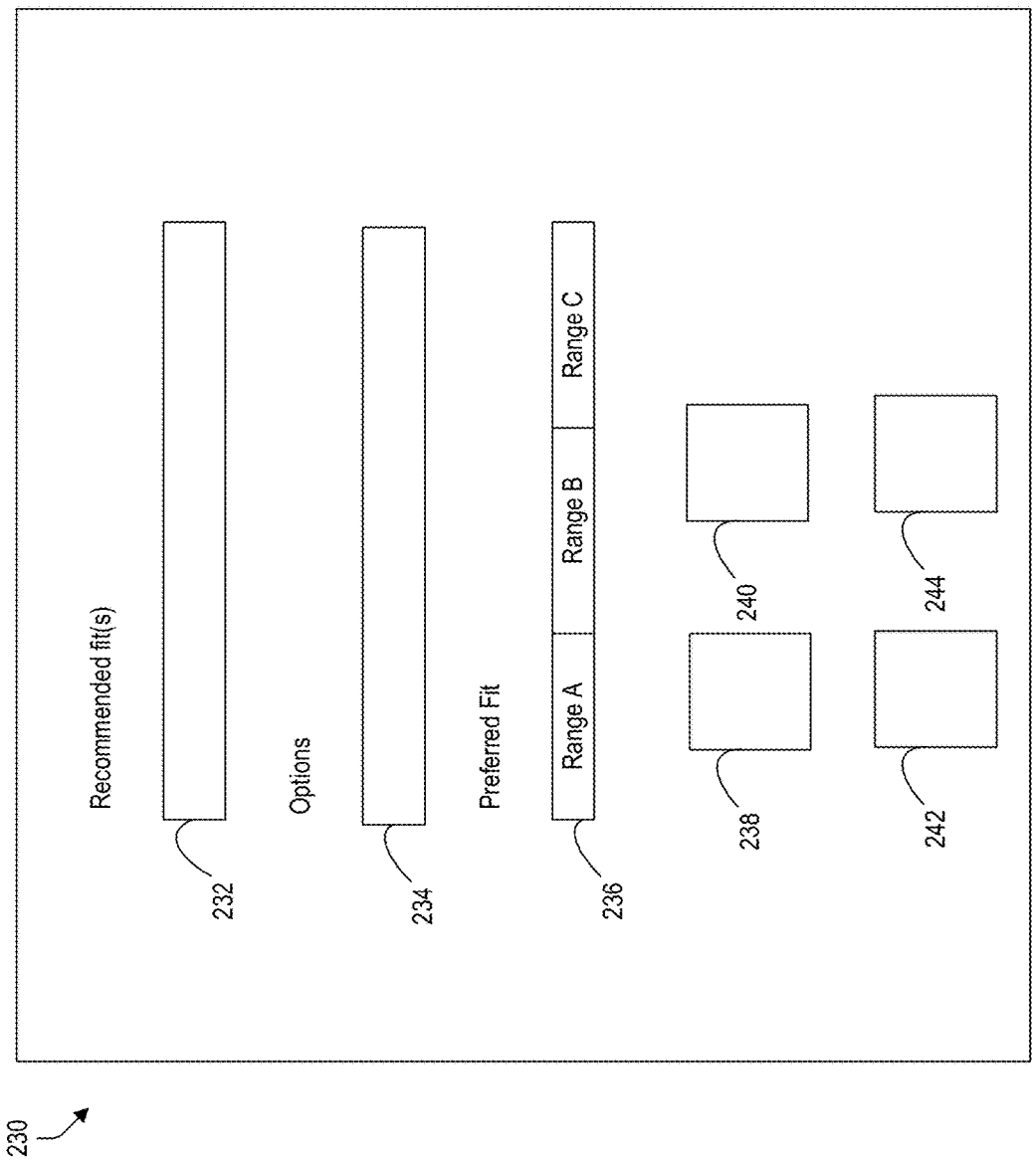

ns and methods for Automatic fitting and product recommendations using machine learning

RELATED APPLICATIONS

This Application claims priority to U.S. Provisional Application 63/189,500 filed on May 17, 2021 and titled "Systems and Methods For Product Discovery Recommendations and Sizing Using Machine Learning,", the entire content of which is incorporated herein by reference.

TECHNICAL FIELD

The present technology pertains to systems and methods for a mobile-based and a web-based fit and product recommendation and discovery. More specifically, the present technology provides individuals, customized size recommendations for different product types through performance of multiple numerical analyses using a number of individual-specific parameters.

BACKGROUND

E-commerce has become the predominant way of buying products by consumers, from various clothing articles to household items, etc. One of the difficulties associated with purchasing such products online, is that often consumers are unaware of their sizes and individual-specific sizes may differ from product to product. This in turn results in a significant number of returns when the consumers receive the purchased products and realize the products do not fit.

Several different tools are available to consumers that attempt to enable them to better find their size and fit. However, these tools rely on consumers themselves to provide their own sizes and/or fail to account for size and fit variation across different product types.

SUMMARY

Techniques disclosed herein provide a tool that addresses the deficiencies of existing fit finding tools available to consumers. More specifically, the techniques disclosed herein discover and recommend to consumers sizes and fits of products tailored to their actual body measurements, which may differ from one product type to another. For instance, an individual may respond to a series of questions and provide a number of individual-specific parameters (e.g., body measurements, body shape, etc.). The system may then use these individual-specific parameters and several databases of professionally fitted products and past product recommendations to consumers with same or similar individual-specific parameters, to perform a number of numerical analyses using the individual-specific parameters and the databases. Based on the numerical analyses and machine learning techniques, the system provides tailored size (fit) recommendations to the individual. The recommendations may include several different sizes for different product types that would be a fit for the individual.

In one aspect, a method includes receiving a plurality of parameters, via a graphical user-interface, the plurality of parameters providing individual-specific measurements pertaining to an article; performing a plurality of numerical analyses using the plurality of parameters; and determining at least one fit recommendation for the user based on the plurality of numerical analyses; determining one or more product recommendations for the user based on the at least one fit recommendation; and outputting the at least one fit recommendation and the one or more product recommendations to the graphical user-interface.

In another aspect, a first of the plurality of numerical analyses includes identifying product recommendations that have been made previously in response to receiving the plurality of parameters, each of the product recommendations having at least one associated size; determining a numerical value associated with the at least one associated size for each of the product recommendations to yield a plurality of numerical values; determining an average of the plurality of numerical values; and determining a first fit recommendation for the user based on the average of the plurality of numerical values.

In another aspect, a second of the plurality of numerical analyses includes performing a multi-neighborhood validation of the first fit recommendation; and determining a second fit recommendation for the user based on the multi-neighborhood validation.

In another aspect, the multi-neighborhood validation includes performing a look-up process to identify at least two nearest neighboring fits of a fit associated with the plurality of parameters; determining a numerical value of each of the at least two nearest neighboring fits; determining an average of numerical values of the at least two nearest neighboring fits; and determining the second fit recommendation based on the average of the numerical values of the at least two neighboring fits.

In another aspect, a third of the plurality of numerical analyses includes determining a numerical power associated with each of the first fit recommendation and the second fit recommendation; and determining at least one third fit recommendation for the user based on the numerical power of at least one of the first fit recommendation and the second fit recommendation, wherein the at least one fit recommendation is determined based on an average of the first fit recommendation, the second fit recommendation, and the third fit recommendation.

In another aspect, the method further includes monitoring transaction activity in association with the one or more product recommendations; collecting a plurality of statistics associated with the transaction; and updating one or more databases of product recommendations using the statistics, the one or more databases of product recommendations being used for the plurality of numerical analyses.

In another aspect, the plurality of parameters include a bodily shape selected from a group of bodily shapes presented to the user on the graphical user interface.

In one aspect, a system includes one or more memories having computer-readable instructions stored therein and one or more processors. The one or more processors configured to execute the computer-readable instructions to receive a plurality of parameters, via a graphical user-interface, the plurality of parameters providing individual-specific measurements pertaining to an article; perform a plurality of numerical analyses using the plurality of parameters; and determine at least one fit recommendation for the user based on the plurality of numerical analyses; determine one or more product recommendations for the user based on the at least one fit recommendation; and output the at least one fit recommendation and the one or more product recommendations to the graphical user-interface.

In one aspect, one or more non-transitory computer-readable media include computer-readable instructions, which when executed by one or more processors of a system, cause the system to receive a plurality of parameters, via a graphical user-interface, the plurality of parameters providing individual-specific measurements pertaining to an article; perform a plurality of numerical analyses using the plurality of parameters; and determine at least one fit recommendation for the user based on the plurality of numerical analyses; determine one or more product recommendations for the user based on the at least one fit recommendation; and output the at least one fit recommendation and the one or more product recommendations to the graphical user-interface.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIGS. 2A-D illustrate example screenshots of frontend platform of system of FIG. 1, according to some aspects of the present disclosure;

DETAILED DESCRIPTION

Figure 1:
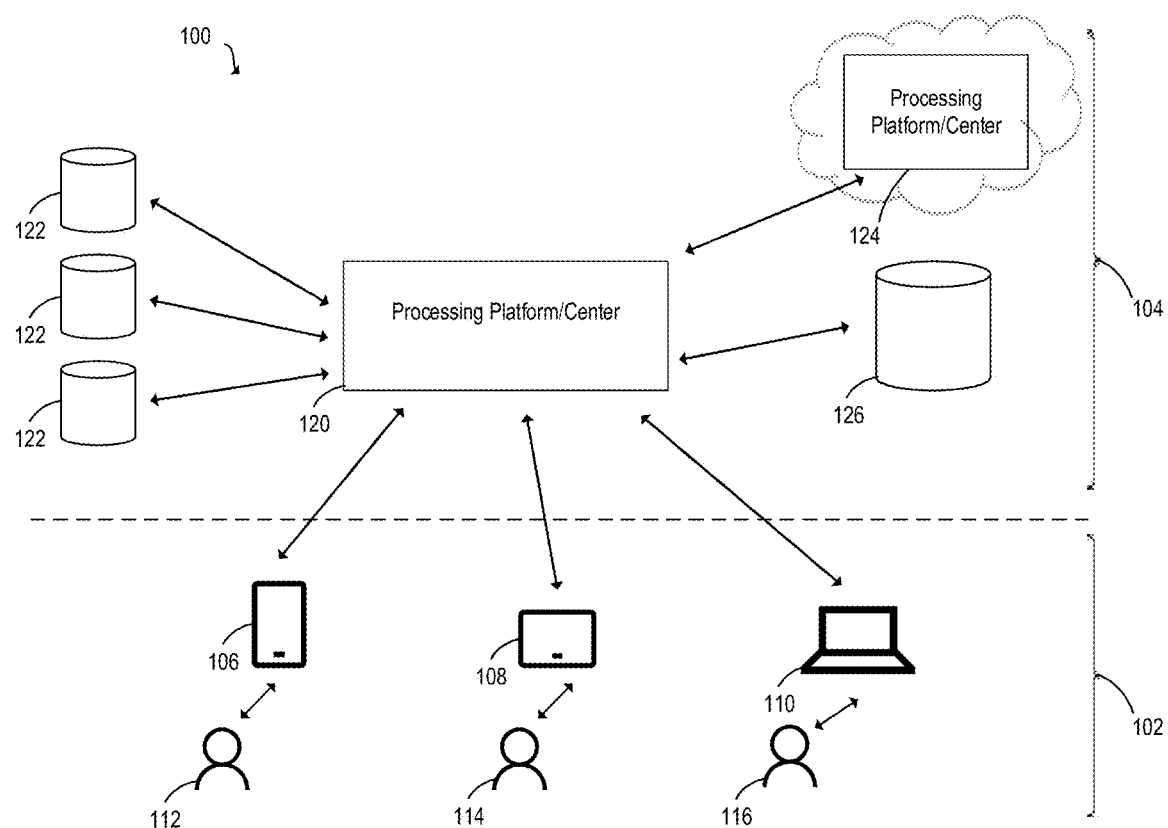
FIG. 1 shows an example system, according to one aspect of the present disclosure.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

As noted above, e-commerce has become the predominant way of buying products by consumers, from various clothing articles to household items, etc. One of the difficulties associated with purchasing such products online, is that often consumers are unaware of their sizes and individual-specific sizes may differ from product to product. This in turn results in a significant number of returns when the consumers receive the purchased products and realize the products don't fit.

Several different tools are available to consumers that attempt to enable them to better find their size and fit. However, these tools rely on consumers to provide their own sizes and/or fail to account for size and fit variation across different product types.

The present disclosure solves several shortcomings of existing technological tools that consumers currently utilize to find their fit before purchasing a product. More specifically, the present disclosure solves the common deficiency of existing tools, namely, their inability to determine and recommend individual-specific and product-specific fits and sizes to consumers.

As will be described in more detail below, the techniques disclosed herein discover and recommend to consumers sizes and fits of products tailored to their actual body measurements, which may differ from one product type to another. For instance, an individual may respond to a series of questions and provide a number of individual-specific parameters (e.g., body measurements, body shape, etc.). The system may then use these individual-specific parameters and several databases of professionally fitted products and past product recommendations to consumers with same or similar individual-specific parameters, to perform a number of numerical analyses using the individual-specific parameters and the databases. Based on the numerical analyses and machine learning techniques, the system provides tailored size (fit) recommendations to the individual. The recommendations may include several different sizes for different product types that would be a fit for the individual.

In some examples, the disclosed technology is a Software-as-a-Service (SaaS) platform with both web and mobile platforms that brands, services, and product manufacturers can utilize to reach their target customers. The system, via the platform, may receive a number of individual-specific parameters such as measurements, body shape, etc. After performing the calculations and the numerical analyses, the system, via the platform may output one or more product recommendations along with recommended sizes for each product.

The disclosure begins with a description of an example system for virtual fitting and product recommendation including backend system components and consumer-facing portals. The disclosure will then continue with example screenshots of the portal through which individual-specific parameters and received and eventually product recommendations are outputted and communicated to consumers. Thereafter, details of numerical analyses performed for determining individual and product specific fits will be described along with example trained neural networks that may be used as part of this process. The disclosure then concludes with example device and system architectures that may be used to implement the systems of the present disclosure.

FIG. 1 shows an example system, according to some aspects of the present disclosure. System 100 of FIG. 1 may include a frontend platform 102 and a backend platform 104. Frontend platform 102 and backend platform 104 may collectively be referred to as a product fitting and recommendation platform or simply the platform.

Frontend platform 102 may be formed of one or more end terminals (user terminals) 106, 108, and 110 each of which may be accessed by a consumer that wishes to purchase a product. As shown in FIG. 1, such consumers can be any one of users 112, 114, and 116, respectively.

End terminals 106, 108, and 110 may be any type of known or to be developed computing device capable of downloading computer-readable instructions/applications for accessing and communicating with backend platform 104 using known or to be developed wired and/or wireless communication schemes. For example, each of end terminals 106, 108, and 110 can be a mobile phone, a tablet, a laptop, a personal digital assistant, a desktop computer, etc. In one example, each of end terminals 106, 108, and 110 can be capable of or be equipped with media capturing components such as a camera (which in some examples may be used to capture photos and videos of an individual, which may be used by the system to identify a bodily shape of the individual). In some examples, end terminals 106, 108, and/or 110 may not necessarily have computer-readable instructions/applications for the platform installed thereon but may instead access the platform through a web browser of end terminal 106, 108, and/or 110. Moreover, end terminals 106, 108, and/or 110 may not necessarily be equipped with media capturing components but instead may have necessary functionalities and features for receiving captured media content and uploading the same to backend platform 104, etc.

While FIG. 1 illustrates only three end terminals 106, 108, and 110, the present disclosure is not limited thereto and there may be more or less end user terminals such as hundreds, thousands or millions of end terminals via which users can access (e.g., through a web browser or downloaded application), subscribe to and use the platform of the present disclosure. Throughout this disclosure, terms "user," "consumer," "customer," and "individual" may be used interchangeably and refers to a person that wishes to purchase a product.

Backend platform 104 may include components including, but not limited to, a processing platform/center 120. Processing center 120 may have one or more memories storing computer-readable instructions, which may be performed by one or more associated processors to implement functionalities that will be described herein. Processing center 120 may also be referred to, throughout the present disclosure, as provider or platform operator 120.

Processing center 120 can provide a downloadable computer-executable application to any one or more of end terminals 106, 108 and 110.

Processing center 120 can have one or more associated databases such as databases 122. The number of databases 122 is not limited to three as shown in FIG. 1 and can be more or less depending on system requirement of system 100, resource consumptions and required resources to service end users and handle network traffic, etc. Databases 122 can be used for storing user profiles, past product recommendations, tables of sizes and their combinations, data from professionally fitted products, etc., all of which will be described below in more detail.

Processing center 120 can communicate with databases 122 using any known or to be developed wired and/or wireless scheme. Furthermore, processing center 120 and/or databases 122 can be cloud-based and hosted on one or more private, public, and/or hybrid cloud structures that may be created and owned by the owner and operator of processing center 120 and/or can be provided by third-party cloud service provider. While FIG. 1 illustrates a single processing center 120, the present disclosure is not limited to and processing center 120 may be implemented in a distributed manner using a network of connected servers to meet processing demands for processing interactions and communication with end terminals and/or other backend components.

Processing center 120 can further be communicatively coupled to one or more external databases and processing centers such as processing center 124 and/or database 126. Processing center 124 and/or database 126 may belong to independent and third-party content providers such as retailers, producers, and sellers of commercial products in various industries such as clothing industry, fashion industry, cosmetics industry, home products, car manufacturers, etc. In one or more examples, database 126 may be a third-party computer vision database utilized by machine trained models of the present disclosure for automated fitting and product recommendation.

Number of databases and processing centers for independent and third-party content providers is not limited to processing center 124 and/or database 126 shown in FIG. 1 but may be more or less.

Processing center (processor) 120 can be communicatively coupled to processing center 124 and/or database 126 via any known or to be developed wired and/or wireless scheme. Processing center 124 and/or database 126 may be cloud-based.

FIGS. 2A-D illustrate example screenshots of frontend platform of system of FIG. 1, according to some aspects of the present disclosure. More specifically, FIGS. 2A-D illustrate example screenshots (graphical user interfaces) of a web portal that is accessible via any one of end terminals 106, 108, and/or 110. As will be described, an individual may be guided through screenshots shown in FIGS. 2A-D to answer a number of questions and provide a plurality of individual-specific measurements (a plurality of parameters) that may then be used by backend platform 104 to run a series of numerical analyses to provide the individual their right fits/sizes and one or more product recommendations. Such measurements may pertain to any number of products that the individual may be interested in purchasing. The product can be any clothing article, a set of clothing articles, an item the individual can carry or use. Examples of such items include, but are not limited to, bags, bicycles, gym and workout equipment, household items and furniture, etc. In the example of household items and furniture, the plurality of individual-specific measurements may not necessary include body measurements but may (instead or in addition to) include dimensional information (e.g., room dimensions).

Figure 2A:
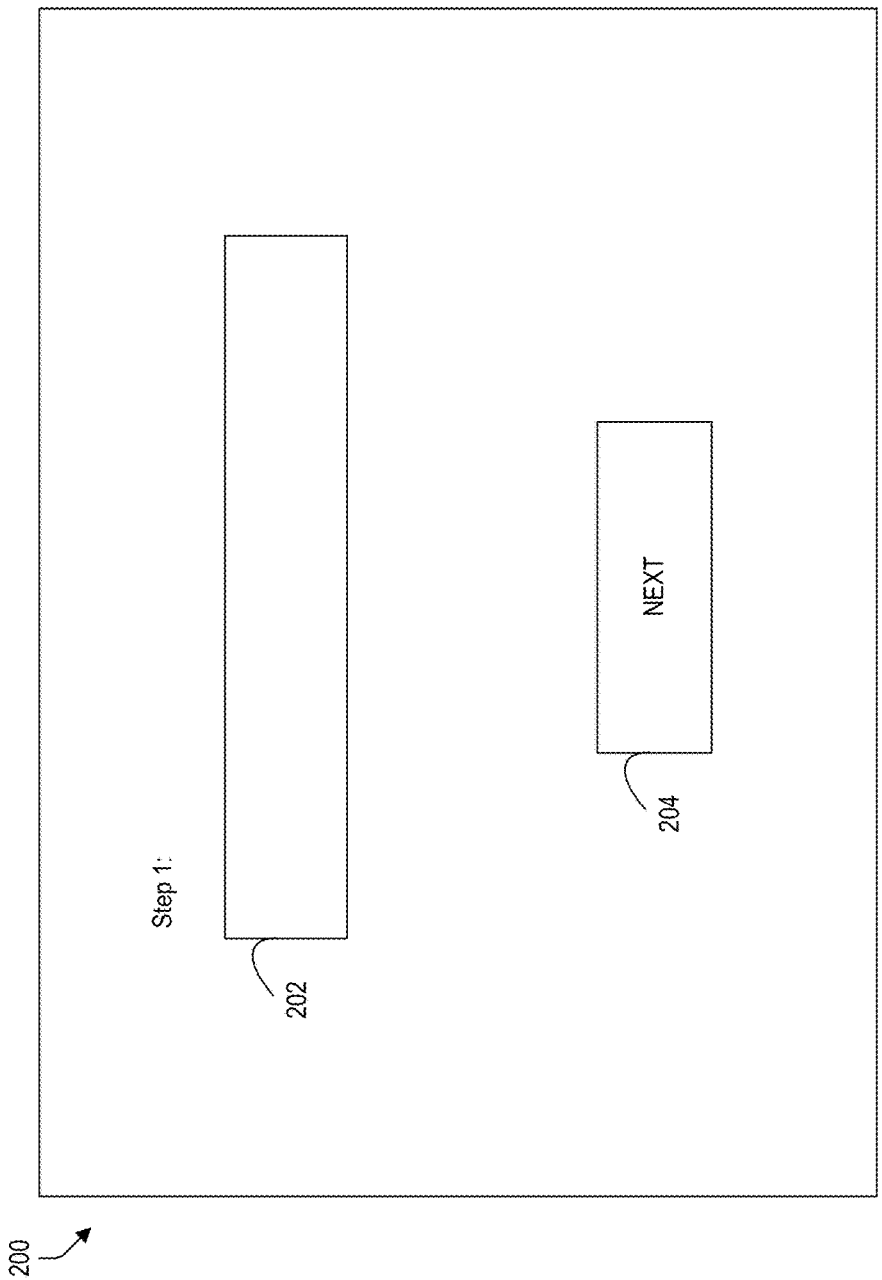
Figure 2B:
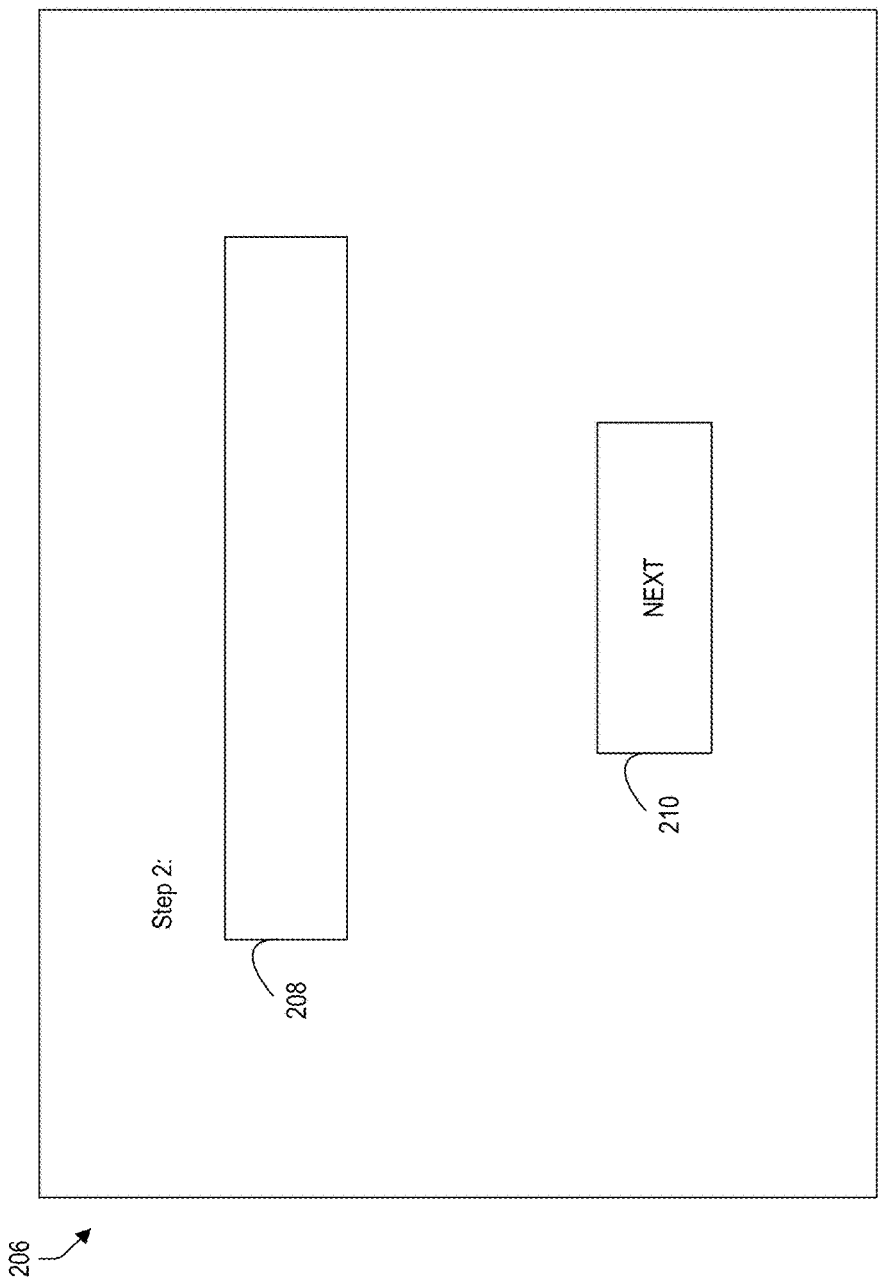
Figure 2C:
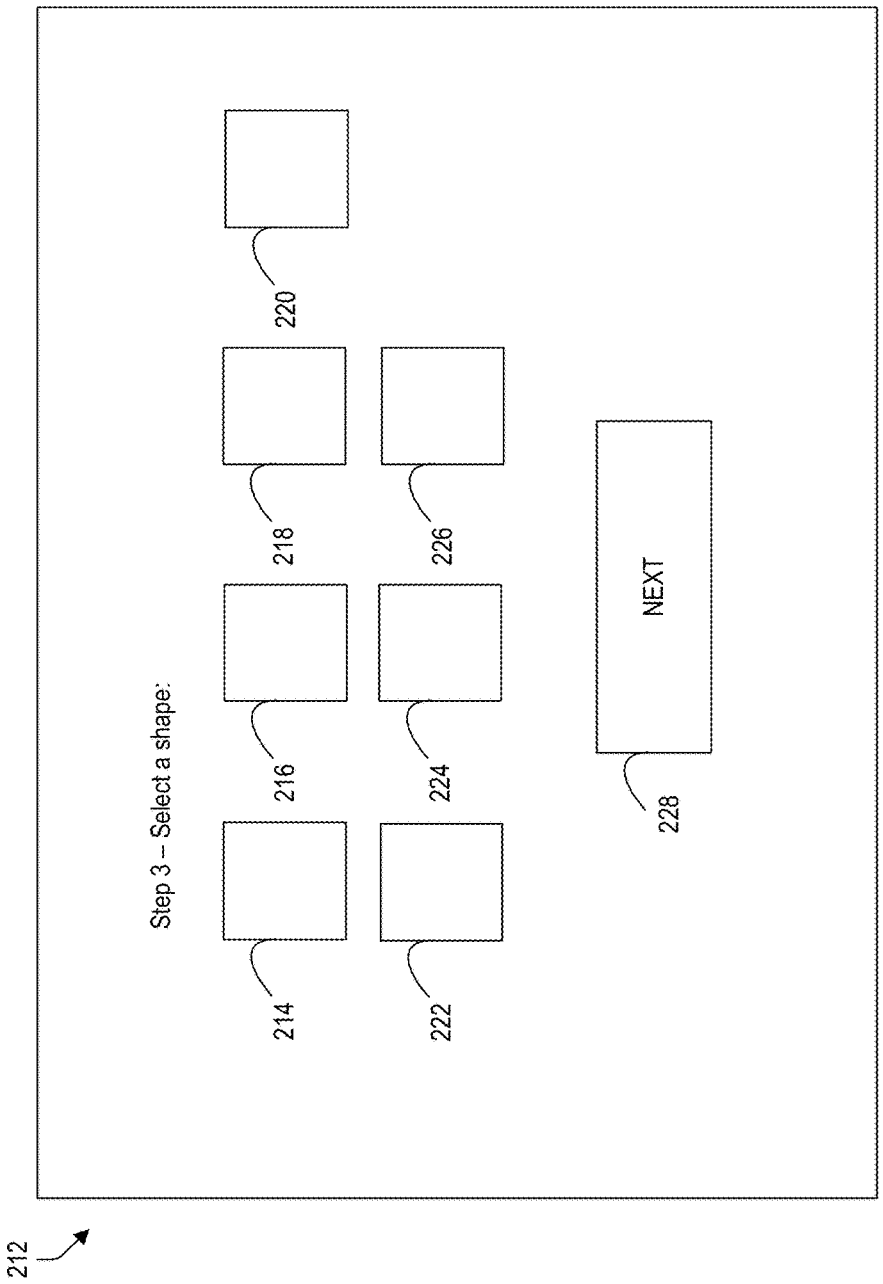

FIG. 2A shows an example screen 200. Screen 200 includes a first question that may be presented to an individual (step 1). The question may ask for a first individual-specific measurement and may optionally have a few sentences that provide the individual with instructions on how to make the first individual-specific measurement. For example, the individual may be interested in purchasing underwear as an example of a clothing article (e.g., one or more bras). Therefore, the first individual-specific measurement asked can be a band size, for which the individual may enter a response in box 202. In another example, the individual may be interested in purchasing a suite. Therefore, the first individual-specific measurement asked can be shoulder-to-shoulder measurement, for which the individual may enter a response in box 202. In another example, the individual may be interested in purchasing a bicycle. Therefore, the first individual-specific measurement asked can be the individual's height, for which the individual may enter a response in box 202.

Once the individual has made and provided an answer for the first individual-specific measurement, the individual may navigate to the next step by clicking button 204. Screen 206 of FIG. 2B may be presented to the individual after clicking button 204. Similar to screen 200, screen 206 may ask for a second individual-specific measurement and may optionally have a few sentences that provide the individual with instructions on how to make the second individual-specific measurement. In the non-limiting example of purchasing bra(s), the second individual-specific measurement asked can be the individual's cup size, for which the individual may enter a response in box 208. In the non-limiting example of purchasing a suite, the second individual-specific measurement asked can be the individual's waist size, for which the individual may enter a response in box 208. In the non-limiting example of purchasing a bicycle, the second individual-specific measurement asked can be the individual's weight, for which the individual may enter a response in box 208.

Once the individual has made and provided an answer for the second individual-specific measurement, the individual may navigate to the next step by clicking button 210. Screen 212 of FIG. 2C may be presented to the individual after clicking button 210. At screen 212, the individual may be asked to select a shape that most accurately represents their individual-specific shape. For example, the individual may be presented with a number of shapes 214-226 (shapes A-G). The number of shapes is not limited to the four shown in FIG. 2D and may be more or less. Furthermore, the shapes may be tailored to the specific product being purchased. In the non-limiting example of purchasing a bra, shapes 214-226 can include round, large, small, flattened, swooping, relaxed, conical, etc. In the non-limiting example of purchasing a suite, shapes 214-222 may each correspond to one of triangular, muscular, oval, broad, common, etc. In this instance and given the fewer shape options relative to bras (e.g., 5 instead of 7), there may be no shape 224 and 226. In the non-limiting example of purchasing a bicycle, shapes 214-220 may each correspond to one of muscular legs, skinny upper body, mesomorphic, common, etc. In this instance and given the fewer shape options relative to bras (e.g., 4 instead of 7), there may be no shape 222, 224, and 226. Each shape from the list of shapes 214-226 may be selected by the individual by hovering over the shape and selecting it.

Once the individual has made and provided an answer for the third individual-specific measurement, the individual may navigate to the next step by clicking button 228. Screen 230 of FIG. 2D may be presented to the individual after clicking button 228.

At screen 230, the individual may be presented with a determination of their recommended size(s)/fit(s). For example, when purchasing a bra, the recommendation 232 on screen 230 may be a bra size (e.g., 34G). Recommendation 232 may include more than one for different regions and measurement scales (e.g., 34G(US)/34F(UK)). In another example, when purchasing a suite, recommendation 232 on screen 230 may be a suite size (e.g., 34 (inches)/86 (cm) for jacket and 32 (inches)/81 (cm) for trousers). In another example, when purchasing a bicycle, recommendation 232 on screen 230 may small, medium, large, include wheel sizes, etc.

Screen 230 may also include a number of additional/optional questions to which the individual may provide individual-specific answers. For instance, on screen 230, the individual may be asked what they are looking for. For example, when purchasing a bra, the individual may be asked to select an answer from options 234 presented on screen 230 (e.g., everyday, nursing bra, sports bra, etc.). When purchasing a suite, the individual may be asked to select an answer from options 234 on screen 230 (e.g., black tie, everyday, etc.). When purchasing a bicycle, the individual may be asked to select an answer from options 234 on screen 230 (e.g., mountain bike, race bike, road bike, electric bike, etc.).

Another example additional/optional question can be the individual's preferred fit which may be presented as a selectable option/range 236 (e.g., preferred band fit for bras such as loose, snug, tight or preferred suite style such as slim, standard, etc.).

Once the individual has answered all the relevant measurement questions and provided all individual-specific measurements, a number of product recommendations 238-244 may be presented to the individual on screen 230. The product recommendations may include different types of products corresponding to recommendation 232. In some examples, a size recommended for one product type may be different from recommendation 232 or the size recommended for a different product type. For instance and with reference to the example of purchasing a bra, consider an example where recommendation 232 is 34G(US). This recommendation may correspond to the preferred product type for the measurements entered (e.g., snug band fit for everyday use). However, other product types (e.g., a sports bra for workouts) may also be presented as one of product recommendations 238-244. Such sports bra may have a different recommended size that is the right fit for the individual based on their inputted individual-specific measurements (e.g., 46D for particular type of sports bra). Similarly, while the recommendation 232 for a bicycle may be large for a mountain bike, product recommendations 238-244 may also include a road bike of size medium-large for the individual. The number of product recommendations is not limited to four as shown in FIG. 2D and may be more or less.

Each of product recommendations 238-244 may be selectable by the individual to complete a purchase. As will be described below, such purchase may be tracked for a period of time to determine if the individual, after receiving the selected product, returns the product or not. That information may be used as feedback using a trained machine learning model to revise and enhance subsequent automatic fit finding and product recommendation by the system.

It should be noted that while a series of four screens 200, 206, 212, and 230 each with one or more individual-specific measurements are described above with reference to FIGS. 2-D, the present disclosure is not limited to the number of example measurements described. The number of individual-specific measurements presented to individuals may be product-specific and may differ from one product (e.g., bras) to another (e.g., furniture).

In another example embodiment and instead of navigating the individual to a number of different screens 200, 206, 212, and 230, all questions relevant to a product being purchased may be presented to the individual on a single screen and the individual can provide their individual-specific measurements on the same screen.

In another example embodiment, an application downloaded on an end terminal such as one of end terminals 106, 108, and/or 110 may be used, whereby an individual may select a product desired to be purchased as the first step and thereafter, the system will tailor the questions and individual-specific measurements that are needed for recommending sizes for the desired product and present the same to the user in subsequent screen(s) on the downloaded application.

One distinguishing aspect of the process through which an individual is guided as described above, compared to existing tools, is that the individual is not asked to provide their size by rather the system itself recommends a size based on individual-specific measurements provided by the individual.

With an individual having furnished their individual-specific measurements, backend platform 104 performs a number of numerical analyses to provide the recommendation 232 described above and product recommendations 238-244. This process will now be described with reference to FIGS. 3 and 4.

Figure 3:
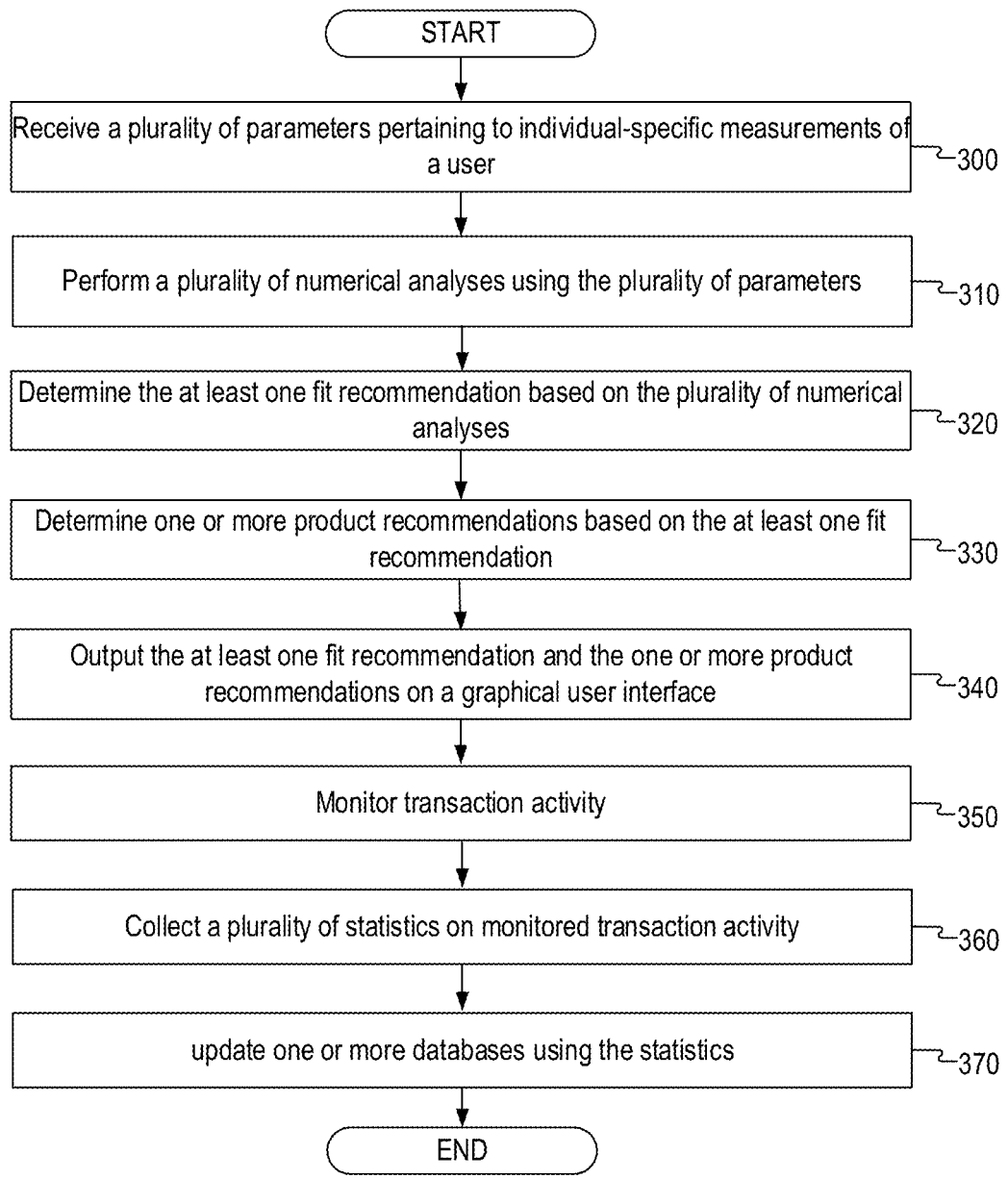
FIG. 3 is an example flow chart of process for automatic fitting and product recommendations, according to some aspects of the present disclosure.

FIG. 3 is an example flow chart of process for automatic fitting and product recommendations, according to some aspects of the present disclosure. The process of FIG. 3 will be described with reference to FIGS. 1 and 2A-D. Furthermore, process of FIG. 3 will be described from the perspective of processing platform 120 (processor 120) at backend platform 104. It should be understood that processor 120 may have one or more memories having computer-readable instructions stored therein and one or more processing components configured to execute the computer-readable instructions to implement the steps of example process of FIG. 3. Furthermore, in describing steps of FIG. 3 non-limiting examples of bras, suites, and/or bicycles described in relation to FIG. 2A-D may be referenced.

At step 300, processor 120 may receive a plurality of parameters from an end terminal such as one of end terminals 106, 108, and/or 110, pertaining to individual-specific measurements of a user (an individual). The plurality of parameters can be any individual-specific measurement such as first, second, and third individual-specific measurements described above with reference to FIGS. 2A-D (e.g., band and cup measurements as well as shape for bras; shoulder-to-shoulder, weight, height and body shape for suites; height, leg shape, body shape, and weight for bicycles, etc.). As described processor 120 may receive the plurality of measurements via a web portal or an application executing on one or more of end terminals 106, 108, and 110.

At step 310, processor 120 may perform a plurality of numerical analyses using the plurality of parameters and data stored in one or more of databases 122 and/or 126 to determine a fit and/or product recommendations for the user. Three non-limiting examples of numerical analyses include a simple average analysis (first analysis of the plurality of numerical analyses), a multi-neighborhood validation analysis (second analysis of the plurality of numerical analyses), and a power analysis (third analysis of the plurality of numerical analyses). Each of these numerical analyses will be described below.

In one example, the simple average analysis may be as follows. Processor 120 may access stored data in one or more of databases 122. Such data may include past fitting and product recommendations when same parameters as the plurality of parameters were provided. For example, over time, many individuals (tens, hundreds, thousands, and even millions of individuals) may have provided individual-specific measurements that are the same as individual-specific measurements that correspond to the plurality of parameters received at step 300. For each such individual, processor 120 may have recommended a particular size (or sizes) and one or more products. The data accessed by processor 120 may be a compilation of all these prior recommended sizes and products.

Processor 120 may determine a simple average of all prior recommended size(s). In some examples, one or more such previously recommended sizes may not readily have associated numerical values. For example, with regard to non-limiting case of bras, previously recommended sizes may be 32F, 34D, 34DD, etc. For any such non-numerical size (e.g., F, D, DD, etc.), processor 120 may determine a numerical value by accessing a conversion table that defines a numerical value for each non-numerical size (e.g., A=2, B=3, C=4, etc.).

Upon determining a simple average of all previously recommended sizes relevant the plurality of parameters received at step 300, processor 120 determines a nearest size corresponding to the average. For example, if the average of all recommended bands (relevant to the plurality of parameters received at step 300) is 31.008, the nearest available standard band (e.g., 32) may be selected as the average of all recommended bands. Similarly, if the average of all recommended cup sizes (relevant to the plurality of parameters received at step 300) is 6.054, the nearest available standard cup (e.g., E) may be selected as the average of all recommended bands. This average of all previous recommended sizes may be referred to as a first fit recommendation (e.g., 32E in the non-limiting example of bras).

In one example, the multi-neighborhood validation analysis may be as follows. For a combination of individual-specific parameters, the system may have a database of sizes. For example, one or more of databases 122 may have a two-dimensional database that associates a size (a fit) with measured band and cup sizes received at step 300 as the individual-specific measurements. Such table may be populated with data from professionally fitted by professional fitter(s). In one instance, when a new product is introduced, such product (e.g., a particular type of bra) may be given to a professional fitter in all available sizes and the professional fitter may determine which sizes fit best for which measurements across all available measurements. A sample of such table is shown in FIG. 4, which will now be referenced.

Figure 4:
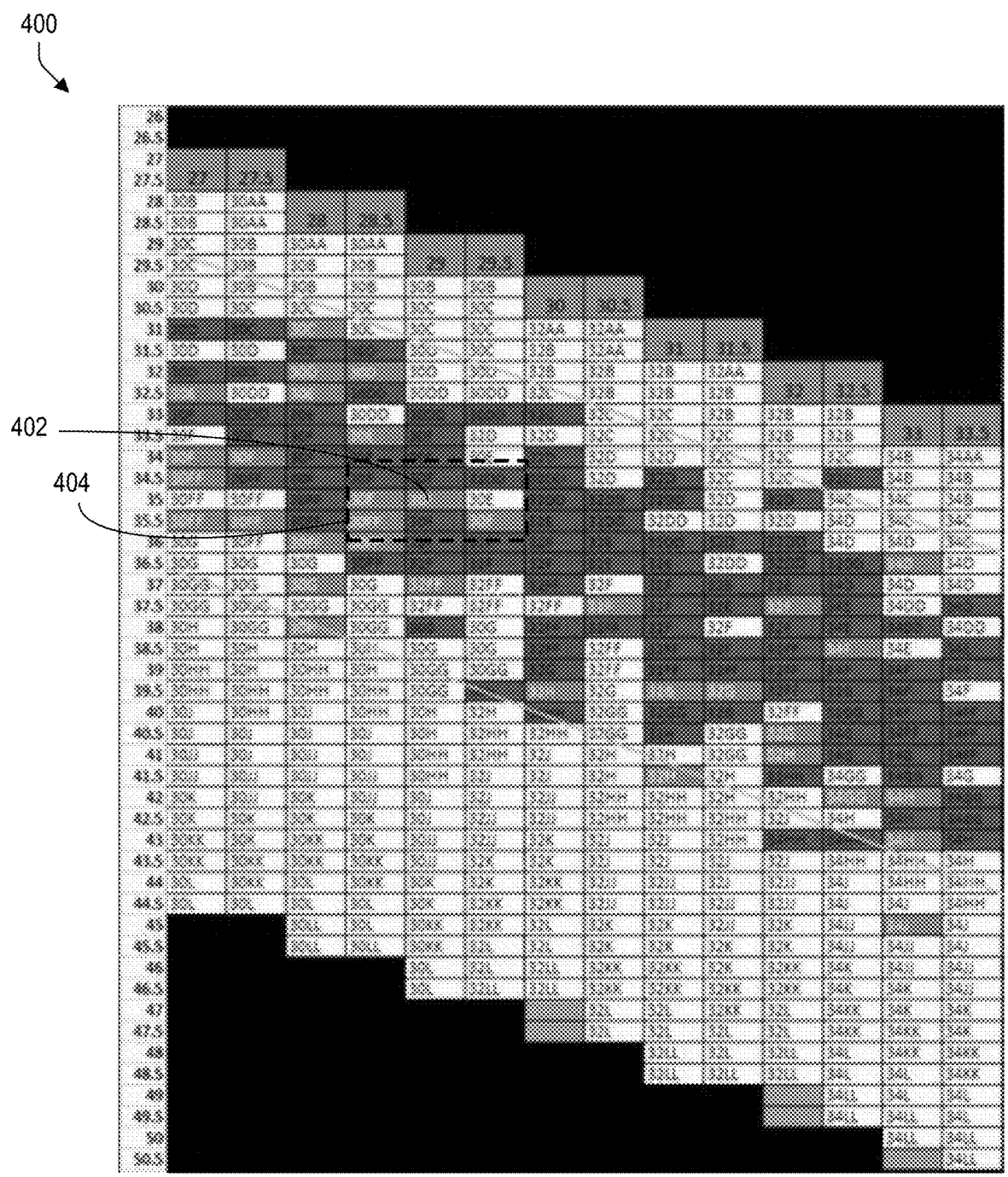
FIG. 4 illustrates a partial view of an example table of sizes associated with combination of individual-specific measurements, according to some aspects of the present disclosure.

FIG. 4 illustrates a partial view of an example table of sizes associated with combination of individual-specific measurements, according to some aspects of the present disclosure. In one example, an individual may enter 29 (inches) as a band measurement and 35 (inches) as the cup measurement at step 300. Table 400 of FIG. 4 illustrates that for the combination (29, 35), a size 30F may be indicated. This is shown as size 402 in FIG. 4 and may be referred to as a fit associated with the plurality of parameters received at step 300. In one example, multi-neighborhood validation comprises a lookup process, where processor 120 identifies (e.g., from table 400) 8 nearest sizes to fit 402. These neighboring fits are shown with reference numeral 404 in FIG. 4.

Referring back to the process of FIG. 3, processor 120 determines a numerical value for each neighboring fit (e.g., numerical values for 30F, 30F, 32DD, 30F, 30E, 30FF, 30F, and 30F as the 8 example neighboring fits for fit 402). As described earlier, processor 120 may have a conversion table for converting cup sizes into numerical values (e.g., for converting Fs, DD, E and FF into numerical values). Processor 120 may then determine an average for the numerical values for the neighboring fits (e.g., average of 30, 30, 32, 30, 30, 30, 30, and 30, which would be 30.25, and an average of numerical values for F (7), F(7), DD(5), F(7), E(6), FF(8), FF(8), F(7), and F(7), which would be 7.75) to determine a second fit recommendation for the individual from which the plurality of parameters is received at step 300. In one example, 30.25 would be rounded to the nearest standard size (e.g., 30.25 is nearest to 30) and 7.75 would be rounded to the nearest integer (e.g., 8, which is the numerical value FF). Therefore, 30FF would be the average of the nearest neighbor fits for the fit associated with combination (29,35), which is an example of a second fit recommendation. An example conversion table 1 for converting cup sizes to numerical values is shown below:

| Example Conversion Table 1 | | | | | | | | | | | | | | | | | |
|---|---|---|---|---|---|---|---|---|---|---|---|---|---|---|---|---|---|
| AA | B | C | D | DD | E | F | FF | G | GG | H | HH | J | JJ | K | KK | L | LL |
| 1 | 2 | 3 | 4 | 5 | 6 | 7 | 8 | 9 | 10 | 11 | 12 | 13 | 14 | 15 | 16 | 17 | 18 |

While an example of 8 neighboring fits is used for describing the multi-neighborhood validation analysis, the present disclosure is not limited thereto. In some examples, the multi-neighborhood validation analysis may be performed with at least two or more neighboring fit values. Also, while a specific example of bras are used to describe the multi-neighborhood validation analysis, the present disclosure is not limited thereto and the same multi-neighborhood validation analysis may be carried out for other products (e.g., suites, bicycles, etc., where used data such as multi-dimensional table 400 or conversion table above are adjusted accordingly for the data representing those specific types of products).

In one example, the power analysis may be as follows. Processor 120, utilizing one or more conversion tables stored at one or more databases 122, may assign a numerical power to each of the first fit recommendation using example conversion table 1 above and example conversion table 2 below.

| Example Conversion Table 2 | | | | | | | | | | | | | | |
|---|---|---|---|---|---|---|---|---|---|---|---|---|---|---|
| 26 | 28 | 30 | 32 | 34 | 36 | 38 | 40 | 42 | 44 | 46 | 48 | 50 | 52 | 54 |
| 1 | 2 | 3 | 4 | 5 | 6 | 7 | 8 | 9 | 10 | 11 | 12 | 13 | 14 | 15 |

As described above, example of first fit recommendation in the context of bras is 32E and example of second fit recommendation is 30FF. A power associated with 32E is 10 (e.g., 32 has a numerical value of 4 from conversion table 2 and E has a numerical value of 6 from conversion table 1, hence 4+6=10). A power associated with 30FF is 11 (e.g., 30 has a numerical value of 3 from conversion table 2 and FF has a numerical value of 8 from conversion table 1, hence 3+8=11).

Thereafter, processor 120 may identify all combinations of fit recommendations having the same power as the first fit recommendation and the second fit recommendation (e.g., all different band and cup sizes having a total power of 10 and 11). Processor 120 may then determine an average of numerical value of all the fit recommendations (e.g., an average of all band sizes and an average of numerical values associated with all cup sizes). Once rounded to the nearest standard size available and/or the nearest integer, this average may be an example of a third fit recommendation.

As described above, each of first, second, and third fit recommendations may have been rounded up or down to the nearest standard size available (e.g., band size of 31.01 is rounded to the nearest standard band of 32) and/or the nearest integer (e.g., numerical value of 7.75 is rounded up to the nearest integer 8). Once the first, second, and third fit recommendations are determined, at step 320 processor 120 may take the real (unrounded) values of the first, second, and third fit recommendations, determine an average of the unrounded values of the first, second, and third fit recommendations, round the average to the nearest standard size and/or nearest integer, to determine a resulting (final) fit recommendation for the individual (i.e., recommendation 232 of FIG. 2D). In one example, the fit recommendation may be a weighted average of the first, second, and third fit recommendations, with weights being determined based on experiments and/or empirical studies.

In one example, the resulting fit recommendation may include more than one fit recommendation for the individual. Furthermore, while three example numerical analyses and hence three resulting fit recommendations have been described, the present disclosure is not limited thereto. In other words, any number of known or to be developed numerical analyses and hence resulting fit recommendations may be used for determining the final fit recommendation for an article of interest to an individual.

At step 330, using the at least one fit recommendation determined at step 320, processor 120 may determine one or more product recommendations for the individual. In one instance, the one or more product recommendation may include products of different types in different sizes. For example, a fit recommendation for an individual determined at step 320 may be 32E. This recommendation, based on information provided by the individual via screens 200, 206, 212, and/or 230, may be for a sports bra and a preferred snug fit. However, sports bras of other shapes and fits may also be a match for the recommended fit for the individual, albeit in different sizes. These example alternative products may be presented to the individual as product recommendations 238-244 described with reference to FIG. 2D.

At step 340, processor 120 may output the at least one fit recommendation (determined at step 320) and the one or more product recommendations (determined at step 330) and output the same to a graphical user interface for the individual in the same manner as described above with reference to FIG. 2D.

At step 350, processor 120 may monitor the individual's online activity (transaction activity) to determine whether the individual (user) has completed a transaction with respect to any one or more of the product(s) recommended to the individual at step 340. In one instance such determination at step 350 may be performed according to any known or to be developed method of tracking and monitoring completion of online commerce (e-commerce).

At step 360, processor 120 may collect a plurality of statistics based on the monitoring. The plurality of statistics can include, but are not limited to, whether the transaction occurred or not, how many transactions occurred, whether the purchased product(s) were ultimately returned or exchanged (e.g., within a defined period of time), etc. These statistics can inform and reflect upon the accuracy of the fit recommendation and/or one or more recommended products by processor 120. For example, if a purchased product is not returned, then the recommended fit is likely to be correct.

Using the collected statistics and one or more trained neural networks (machine learning models), at step 370, processor 120 may update one or more databases (e.g., databases 122 and/or 126) to improve the data that is utilized for numerical analyses described above. For example, if 90% of products recommended for a size associated with individual-specific measurements X and Y (e.g., (29, 35)) are returned, then two-dimensional table utilized for the multi-neighborhood validation may have to be updated to have a correct fit for that combination of measurements. Examples of trained neural networks will be described next with reference to FIG. 5.

Figure 5:
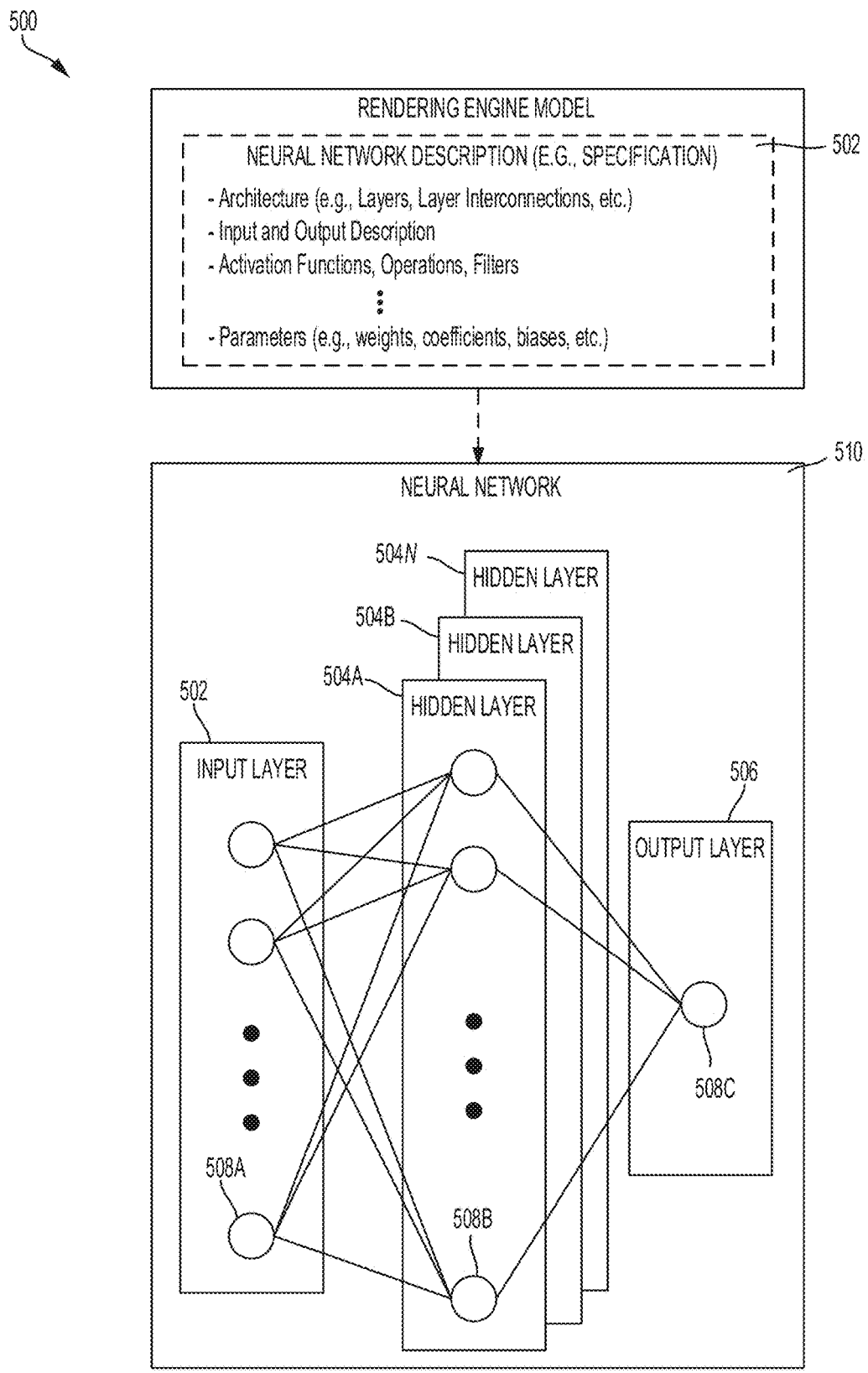
FIG. 5 illustrates an example neural network architecture that can be trained for use with the system for automatic fitting and product recommendations, according to some aspects of the present disclosure.

FIG. 5 illustrates an example neural network architecture that can be trained for use with the system for automatic fitting and product recommendations, according to some aspects of the present disclosure. Architecture 500 includes a neural network 510 defined by an example neural network description 501 stored in rendering engine model 530. Neural network 510 can represent a neural network implementation by processor 120 for performing at least step 370 of FIG. 3. Neural network description 501 can include a full specification of neural network 510. For example, neural network description 501 can include: a description or specification of neural network 510 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 510 includes an input layer 502, which includes input data such as statistics collected on transactions, as described above with reference to steps 350 and 360 of FIG. 3. While such input data is reflective of inputs to trained neural networks such as neural network 510, when deployed and utilized for machine learning based adjustment and update of data used for numerical analyses described above, neural network 510 and/or other networks utilized may be trained first using similar input data already collected (e.g., stored in databases 122 and/or 126 of FIG. 1) by processor 120. A portion of the training data set may be used for testing and validating the trained neural networks. Furthermore, when deployed in real-time, each time data stored in databases 122 and/or 126 is/are updated, the resulting data may be used to refine and update the corresponding neural networks, thus providing a continuous updating of the utilized neural networks. Training data may, in part, use information available from public or third-party databases to detect items and/or identify associated metadata. Training data may, also in part, use historical information collected on past uploaded content and user trends in types of clothing articles and belongings that the user is interested in, associated brands, retailers, types of articles and belongings, etc.

Neural network 510 includes hidden layers 504A through 504N (collectively "504" hereinafter). Hidden layers 504 can include n number of hidden layers, where n is a positive integer greater than or equal to one. The number of hidden layers can include as many layers as needed for a desired processing outcome and/or rendering intent. Neural network 510 further includes an output layer 506 that provides an output from the processing performed by hidden layers 504. In one illustrative example, output layer 506 can be necessary updates to data stored in databases 122 and/or 126 based on the collected statistics.

In one example, neural network 510 is a multi-layer neural network of interconnected nodes. Each node can represent a piece of information. Information associated with the nodes is shared among the different layers and each layer retains information as information is processed. In some cases, neural network 510 can include a feed-forward neural network, in which case there are no connections between nodes that form an enclosed cycle, or where outputs of the neural network are fed back into itself. In other cases, neural network 510 can include a recurrent neural network, such as a Hopfield network, which can have loops that allow information to be carried across nodes while reading in input. Some recurrent neural networks can be simplified as feed-forward neural networks, while others can only be implemented as recurrent neural networks. Another example neural network can be a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 510 can represent any other neural or deep learning network, such as an autoencoder, a deep belief nets (DBNs), Recurrent Neural Networks (RNNs), etc.

Information can be exchanged between nodes through node-to-node interconnections between the various layers. Nodes of input layer 502 can activate a set of nodes in first hidden layer 504A. For example, as shown, each of the input nodes of input layer 502 is connected to each of the nodes of first hidden layer 504A. The nodes of hidden layer 504A can transform the information of each input node by applying activation functions to the information. The information derived from the transformation can then be passed to and can activate the nodes of the next hidden layer (e.g., 504B), which can perform their own designated functions. Example activation functions include convolutional, up-sampling, data transformation, pooling, and/or any other suitable functions. The output of the hidden layer (e.g., 504B) can then activate nodes of the next hidden layer (e.g., 504N), and so on. The output of the last hidden layer can activate one or more nodes of output layer 506, at which point an output can be provided. In some cases, while nodes (e.g., nodes 508A, 508B, 508C) in neural network 510 are shown as having multiple output lines, a node has a single output and all lines shown as being output from a node represent the same output value.

In some cases, each node or interconnection between nodes can have a weight that is a set of parameters derived from training neural network 510. For example, an interconnection between nodes can represent a piece of information learned about the interconnected nodes. The interconnection can have a numeric weight that can be tuned (e.g., based on a training dataset), allowing neural network 510 to be adaptive to inputs and able to learn as more data is processed.

Neural network 510 can be pre-trained to process the features from the data in input layer 502 using the different hidden layers 504 in order to provide the output through output layer 506. In some cases, neural network 510 can adjust weights of nodes using a training process called backpropagation. Backpropagation uses the difference between the output of neural network 510 and the desired output to compute an error in the calculation made by neural network 510. This error can then be passed among the nodes of neural network 510 to adjust weights and result in a more accurate calculation of the desired output. Backpropagation can include a forward pass, a loss function, a backward pass, and a weight update. The forward pass, loss function, backward pass, and parameter update is performed for one training iteration. The process can be repeated for a certain number of iterations for each set of training data until the weights of the layers are accurately tuned.

For a first training iteration for neural network 510, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 510 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 510 can perform a backward pass by determining which inputs (weights) most contributed to the loss of neural network 510 and can adjust the weights so that the loss decreases and is eventually minimized.

A derivative of the loss with respect to the weights can be computed to determine the weights that contributed most to the loss of neural network 510. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates. Accordingly, a defined neural network can be trained as desired.

With above examples of techniques for automatic fitting and product recommendations described, the disclosure now turns to description of components of possible devices that may be implemented as any one or more of end terminals 106, 108, 110, processor 120 and/or any other component of system 100 described above with reference to FIG. 1.

Figure 6:
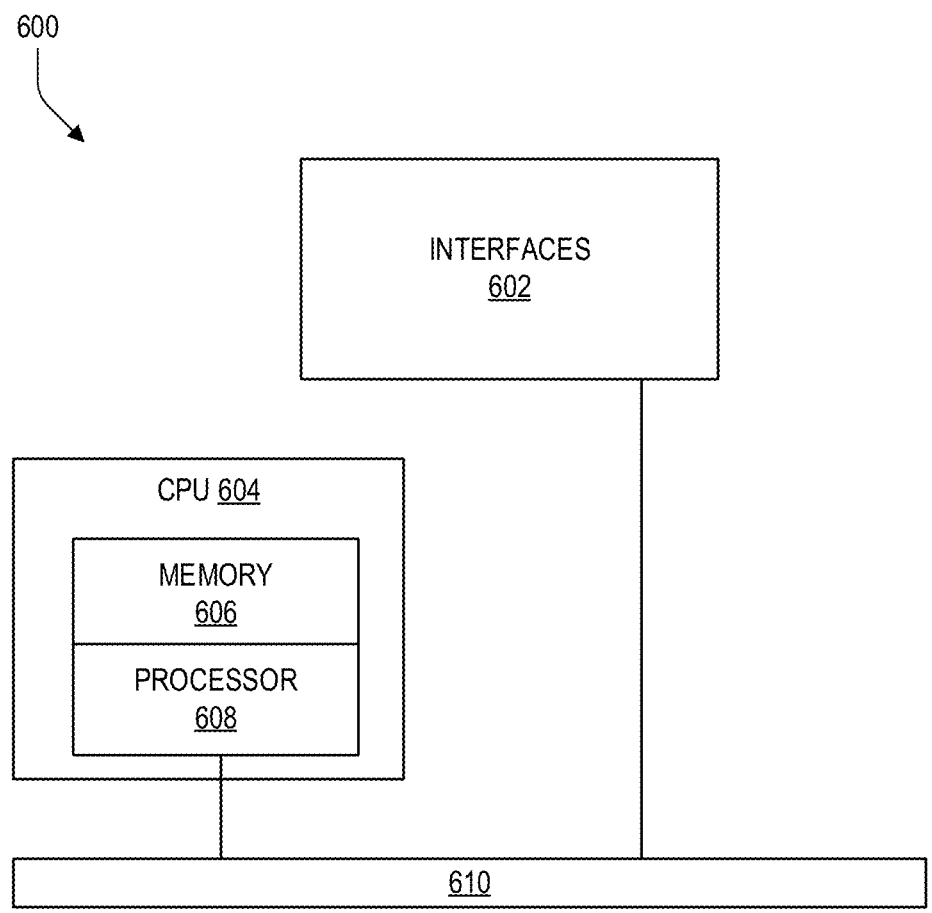
FIG. 6 illustrates an example of a network device, according to some aspects of the present disclosure.

FIG. 6 illustrates an example of a network device, according to some aspects of the present disclosure. FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 604 to efficiently perform routing computations, network diagnostics, security functions, etc.

Although the system shown in FIG. 6 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

Figure 7:
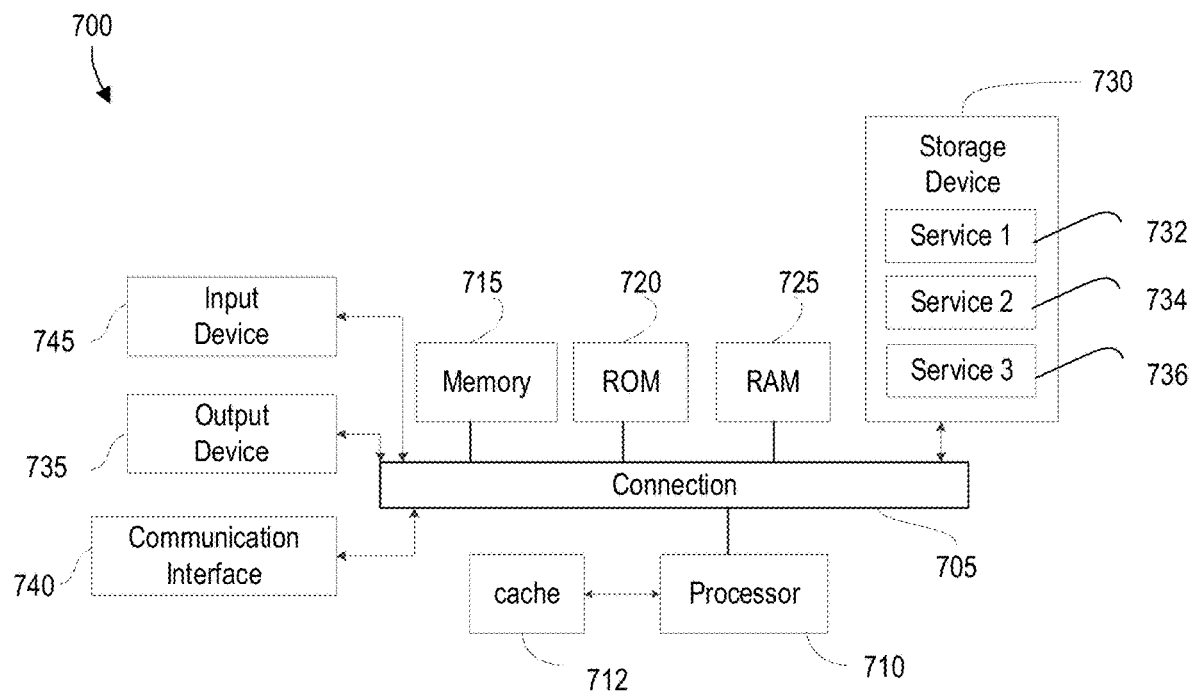
FIG. 7 illustrates an example computing system, according to some aspects of the present disclosure.

FIG. 7 illustrates an example computing system, according to some aspects of the present disclosure. FIG. 7 illustrates an example computing system 700 including components in electrical communication with each other using a connection 705 upon which one or more aspects of the present disclosure can be implemented. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A method comprising:
receiving a plurality of parameters, via a graphical user-interface, the plurality of parameters providing individual-specific measurements pertaining to an article;
performing a plurality of numerical analyses using the plurality of parameters;
determining at least one fit recommendation for a user based on the plurality of numerical analyses;
determining one or more product recommendations for the user based on the at least one fit recommendation;
outputting the at least one fit recommendation and the one or more product recommendations to the graphical user-interface;
tracking data associated with interaction with the at least one fit recommendation and the one or more product recommendations on the graphical user-interface; and
inputting the data into a trained neural network to enhance subsequent fit recommendations and subsequent product recommendations.

2. The method of claim 1, wherein a first of the plurality of numerical analyses comprises:
identifying product recommendations that have been made previously in response to receiving the plurality of parameters, each of the product recommendations having at least one associated size;

determining a numerical value associated with the at least one associated size for each of the product recommendations to yield a plurality of numerical values;

determining an average of the plurality of numerical values; and determining a first fit recommendation for the user based on the average of the plurality of numerical values.

3. The method of claim 2, wherein a second of the plurality of numerical analyses comprises:

performing a multi-neighborhood validation of the first fit recommendation; and determining a second fit recommendation for the user based on the multi-neighborhood validation.

4. The method of claim 3, wherein the multi-neighborhood validation comprises:

performing a look-up process to identify at least two nearest neighboring fits of a fit associated with the plurality of parameters;

determining a numerical value of each of the at least two nearest neighboring fits;

determining an average of numerical values of the at least two nearest neighboring fits; and determining the second fit recommendation based on the average of the numerical values of the at least two neighboring fits.

5. The method of claim 3, wherein a third of the plurality of numerical analyses comprises:

determining a numerical power associated with each of the first fit recommendation and the second fit recommendation; and determining at least one third fit recommendation for the user based on the numerical power of at least one of the first fit recommendation and the second fit recommendation, wherein the at least one fit recommendation is determined based on an average of the first fit recommendation, the second fit recommendation, and the third fit recommendation.

6. The method of claim 1, further comprising:

monitoring transaction activity in association with the one or more product recommendations;

collecting a plurality of statistics associated with the transaction; and updating one or more databases of product recommendations using the statistics, the one or more databases of product recommendations being used for the plurality of numerical analyses.

7. The method of claim 1, wherein the plurality of parameters include a bodily shape selected from a group of bodily shapes presented to the user on the graphical user-interface.

8. A system comprising:

one or more memories having computer-readable instructions stored therein; and one or more processors configured to execute the computer-readable instructions to:

receive a plurality of parameters, via a graphical user-interface, the plurality of parameters providing individual-specific measurements pertaining to an article;

perform a plurality of numerical analyses using the plurality of parameters; and determine at least one fit recommendation for a user based on the plurality of numerical analyses;

determine one or more product recommendations for the user based on the at least one fit recommendation;

output the at least one fit recommendation and the one or more product recommendations to the graphical user-interface;

track data associated with interaction with the at least one fit recommendation and the one or more product recommendations on the graphical user-interface; and input the data into a trained neural network to enhance subsequent fit recommendations and subsequent product recommendations.

9. The system of claim 8, wherein a first of the plurality of numerical analyses comprises:

identifying product recommendations that have been made previously in response to receiving the plurality of parameters, each of the product recommendations having at least one associated size;

determining a numerical value associated with the at least one associated size for each of the product recommendations to yield a plurality of numerical values;

determining an average of the plurality of numerical values; and determining a first fit recommendation for the user based on the average of the plurality of numerical values.

10. The system of claim 9, wherein a second of the plurality of numerical analyses comprises:

performing a multi-neighborhood validation of the first fit recommendation; and determining a second fit recommendation for the user based on the multi-neighborhood validation.

11. The system of claim 10, wherein the multi-neighborhood validation comprises:

performing a look-up process to identify at least two nearest neighboring fits of a fit associated with the plurality of parameters;

determining a numerical value of each of the at least two nearest neighboring fits;

determining an average of numerical values of the at least two nearest neighboring fits; and determining the second fit recommendation based on the average of the numerical values of the at least two neighboring fits.

12. The system of claim 10, wherein a third of the plurality of numerical analyses comprises:

determining a numerical power associated with each of the first fit recommendation and the second fit recommendation; and determining at least one third fit recommendation for the user based on the numerical power of at least one of the first fit recommendation and the second fit recommendation, wherein the at least one fit recommendation is determined based on an average of the first fit recommendation, the second fit recommendation, and the third fit recommendation.

13. The system of claim 8, wherein the one or more processors are further configured to execute the computer-readable instructions to:

monitor transaction activity in association with the one or more product recommendations;

collect a plurality of statistics associated with the transaction; and update one or more databases of product recommendations using the statistics, the one or more databases of product recommendations being used for the plurality of numerical analyses.

14. The system of claim 8, wherein the plurality of parameters include a bodily shape selected from a group of bodily shapes presented to the user on the graphical user-interface.

15. One or more non-transitory computer-readable media comprising computer-readable instructions, which when executed by one or more processors of a system, cause the system to:
- receive a plurality of parameters, via a graphical user-interface, the plurality of parameters providing individual-specific measurements pertaining to an article;
- perform a plurality of numerical analyses using the plurality of parameters; and
- determine at least one fit recommendation for a user based on the plurality of numerical analyses;
- determine one or more product recommendations for the user based on the at least one fit recommendation;
- output the at least one fit recommendation and the one or more product recommendations to the graphical user-interface;
- track data associated with interaction with the at least one fit recommendation and the one or more product recommendations on the graphical user-interface; and
- input the data into a trained neural network to enhance subsequent fit recommendations and subsequent product recommendations.

16. The one or more non-transitory computer-readable media of claim 15, wherein a first of the plurality of numerical analyses comprises:
- identifying product recommendations that have been made previously in response to receiving the plurality of parameters, each of the product recommendations having at least one associated size;
- determining a numerical value associated with the at least one associated size for each of the product recommendations to yield a plurality of numerical values;
- determining an average of the plurality of numerical values; and
- determining a first fit recommendation for the user based on the average of the plurality of numerical values.

17. The one or more non-transitory computer-readable media of claim 16, wherein a second of the plurality of numerical analyses comprises:
- performing a multi-neighborhood validation of the first fit recommendation; and
- determining a second fit recommendation for the user based on the multi-neighborhood validation.

18. The one or more non-transitory computer-readable media of claim 17, wherein the multi-neighborhood validation comprises:
- performing a look-up process to identify at least two nearest neighboring fits of a fit associated with the plurality of parameters;
- determining a numerical value of each of the at least two nearest neighboring fits;
- determining an average of numerical values of the at least two nearest neighboring fits; and determining the second fit recommendation based on the average of the numerical values of the at least two neighboring fits.

19. The one or more non-transitory computer-readable media of claim 17, wherein a third of the plurality of numerical analyses comprises:
- determining a numerical power associated with each of the first fit recommendation and the second fit recommendation; and
- determining at least one third fit recommendation for the user based on the numerical power of at least one of the first fit recommendation and the second fit recommendation, wherein the at least one fit recommendation is determined based on an average of the first fit recommendation, the second fit recommendation, and the third fit recommendation.

20. The one or more non-transitory computer-readable media of claim 15, wherein the one or more processors are further configured to execute the computer-readable instructions to:
- monitor transaction activity in association with the one or more product recommendations; collect a plurality of statistics associated with the transaction; and
- update one or more databases of product recommendations using the statistics, the one or more databases of product recommendations being used for the plurality of numerical analyses.

* * * * *